No. 759,208. Patented May 3, 1904.

UNITED STATES PATENT OFFICE.

PAUL BACHMANN, OF COLOGNE, GERMANY.

PROCESS OF MAKING AN INSECTICIDE.

SPECIFICATION forming part of Letters Patent No. 759,208, dated May 3, 1904.

Application filed June 16, 1902. Serial No. 111,853. (No specimens.)

*To all whom it may concern:*

Be it known that I, PAUL BACHMANN, tradesman, a subject of the King of Prussia, German Emperor, and a resident of No. 7 Brusselerstrasse, Cologne-on-the-Rhine, in the Kingdom of Prussia and Empire of Germany, have invented new and useful Improvements in Compositions of Matter for Combating Scabies, of which the following is a specification.

Known is the chemical compound called dioxinaphthylmethane $(C_{10}H_7O)_2CH_2$, which compound, according to the processes hitherto in use, has been obtained on the base that naphthol dissolved in acetic acid or in alcohol is converted with the formic aldehyde into a condensation product. Dioxinaphthylmethane could hitherto find no medical use on account of its insolubility in water.

The object of the present invention is to make the production of dioxinaphthylmethane more simple and considerably less expensive and to obtain a soluble form thereof. For attaining such result I dissolve, by way of example, five ounces of naphthol, with the aid of heat, in ten ounces of a solution of formaldehyde containing forty parts of the latter in one hundred parts of water, and to such compound I add a soap-lye consisting of two parts of soap dissolved in three parts of alcohol. Now soap has turned out to act, similar to hydrochloric acid, as a reacting medium, with the difference that such reaction takes considerably more time, inasmuch as the product must be boiled for two to three hours at the reflux-cooler until its yellow color be converted into a yellowish reddish one. This alteration of the color is the sign for the end of the reaction.

For the purpose of ascertaining whether naphthol has been converted into dioxinaphthylmethane I take one ounce of the solution obtained by the aforesaid process, dilute same with water, and mix it with hydrochloric acid until a slightly acid reaction sets in, whereupon the liquid part is filtered off, the unfiltered matter made anhydrous and extracted with alcohol. The filtrate is allowed to crystallize, and by repeated recrystallization white needle-shaped crystals which melt at a temperature of 370° Fahrenheit and take a reddish color under the action of the air are obtained.

I am aware that prior to my invention dioxinaphthylmethane has been produced; but the preparation obtained by the old processes has been of no medical use whatever on account of its being insoluble in water. I therefore do not claim such a composition broadly; but

What I claim as my invention, and desire to secure by Letters Patent, is—

The process of obtaining a dioxinaphthylmethane preparation, soluble in water, and which consists in heating a mixture of liquid potash-soaps and naphthol dissolved in formalin, substantially as and for the purpose set forth.

In testimony whereof I have signed my name to this specification, this 14th day of April, 1902, in the presence of two subscribing witnesses.

PAUL BACHMANN.

Witnesses:
CHARLES LESIMPLE,
JOH. SCHOLZ.